Patented May 12, 1925.

1,537,597

UNITED STATES PATENT OFFICE.

GEORGE W. FREIBERG, OF ST. LOUIS, MISSOURI.

PROCESS FOR PRODUCING ACETONE AND BUTYL ALCOHOL.

No Drawing. Application filed July 17, 1924. Serial No. 726,574.

*To all whom it may concern:*

Be it known that I, GEORGE W. FREIBERG, a citizen of the United States, residing at St. Louis, Missouri, have invented a certain new and useful Improvement in Processes for Producing Acetone and Butyl Alcohol, of which the following is a full, clear, and exact description, such as will enable others skilled in the art to which it appertains to make and use the same.

This invention relates to the production of acetone and butyl alcohol by fermentation, and has for its main object to provide a process wherein the fermentation of carbohydrate material or carbon compounds readily transformed into neutral substances such as acetone and butyl alcohol, is effected by bacteria which may be widely distributed in nature and not heretofore discovered.

Prior to my invention the production of acetone and butyl alcohol has presented numerous problems and difficulties, for example, special treatment of the mash to be fermented was necessary; fermentation could be accomplished under aerobic conditions; the bacteria used were of restricted habitat and the bacteria employed possessed the characteristic of either always liquefying nutrient gelatine or (in other instances) of never liquefying gelatine.

I have discovered that neutral substances such as acetone and butyl alcohol can be produced by fermenting carbohydrate or carbon compounds readily transformed into such neutral substances, by means of bacteria classed as anaerobes that may be rather widely distributed in nature, are capable of forming large resistant spores, and do not liquefy nutrient gelatine, which anaerobes I have named "*Bacillus butylaceticum*" and which will be hereinafter more clearly described. The process is an anaerobic process, but special apparatus is not necessary for the exclusion of air from freshly boiled and cooled mashes, or from mashes or worts which have not absorbed air (oxygen) to a degree which will affect the normal activity of the bacteria, since when inoculated with an active culture of these anaerobes, the excessive evolution of gases resulting from the fermentation maintains anaerobic conditions within the mash. In my process special treatment of amylaceous mashes with "degraded yeast" or other organisms is not necessary to render them fermentable.

The bacteria used in my process may be secured by employing the usual bacteriological technique. The isolation of these bacteria is facilitated by destroying, by means of heat, undesired nonspore forming organisms, or all vegetative cells or organisms forming spores which are only slightly resistant, by adding a substance such as grain, soil, etc. to sterile boiling water, the boiling being discontinued shortly or immediately after the addition of the material. Or the substance with which the bacteria may be associated may be suspended in water and the suspension heated in any manner which will destroy vegetative cells, as, for example, heating at about 75° C. for fifteen to twenty-five minutes. Anaerobic cultures are then made from the above suspension of bacteria, in proper dilutions, in a medium such as nutrient agar containing a small amount of carbohydrate such as dextrose, lactose or starch and incubated at about 36° C. Upon the appearance of colonies or small gas bubbles in the media, transfers are made from these colonies or gas areas into any suitable media, such as potato media and incubated at about 36° C. The resulting cultures serve as a source for subsequent cultures for further bacteriological examination of the purity of the cultures and for the determination of fermentative qualities. However, the method of isolation may be varied in accordance with individual preference.

In testing the fermentative qualities of various organisms, media consisting of potato, rice, maize, etc. may be employed. A convenient method is that of adding 0.5 to 1.0 c. c. of the resting culture to be tested to tubes containing about 10 c. c. of potato or maize media which has just been sterilized. The inoculation of the hot media immediately after removal from the sterilizer serves the purpose of killing all or many forms in the inoculant other than resistant spores and also provides a medium anaerobic to a degree which facilitates the growth of the desired organisms. The inoculated tubes are incubated at about 36° C. for twenty-four hours, or until fermentation is evident, after which flasks of sterile cooled media may be inoculated, or sub-cultures may be made into other tubes, which, after about twenty-four hours, may serve as inoculant for tubes or flasks. The flasks may, after about twenty-four hours, be utilized as inoculant for larger quantities of mash, or may be permitted to ferment to completion for the analysis of products produced.

Following the inoculation of media with spores, the culture goes through a growth stage during which the organisms multiply, which, in turn, is followed by a growth acid fermentation stage during which carbon dioxide, hydrogen, volatile acids and a small amount of non-volatile titratable acidity is produced. This stage is in turn followed by the growth alcoholic fermentation stage, during which the acidity declines, neutral products such as acetone and butyl alcohol are formed in abundance, large quantities of carbon dioxide and hydrogen are evolved and the non-volatile titratable acidity increases slightly and gradually. This is only a very general account of the progress of a fermentation of an untreated mash of potato or maize.

The organism *Bacillus butylaceticum* used in the foregoing process is an anaerobe, positive to Gram's stain, and forming resistant spores. The spores of these bacteria are oval to cylindrical in form the smallest of which average about 1.2 microns in width and about 2.2 microns in length. Larger spores up to about 2.0 microns in width and up to about 3.0 microns long commonly occur. Vegetative cells in a fifteen hour old culture of 5% maize in distilled water, average about 0.4 to 0.6 micron in width and about 3.0 to 4.0 microns in length, the length, however, being dependent upon the age and stage of development of the individual organisms. These vegetative cells are cylindrical rods with rounded ends, occurring singly, at times in pairs or in chains. During the latter stage of the fermentation spore formation begins by a modification of the vegetative rods into fusiform or spindle shaped forms. In the center of the cell the spore begins to develop. In part, or one or both ends of the fusiform cells usually stain violet or blue with iodine. Towards the close of the fermentation well formed spores may be observed in the mash and their number increases when active fermentation has ceased. The dimensions of the different forms may vary slightly under different physiological conditions and the vegetative rods themselves may be slightly curved.

One of the distinguishing characteristics of this organism is its behavior in gelatine media prepared in accordance with the directions of the American Public Health Association, which directions it, of course, is understood, are in harmony with the bacteriological methods regarded as standard for bacteriological cultures in all the principal countries. When transplanting from a fermenting culture of maize in distilled water into nutrient gelatine having a reaction of +0.5 to +1.0 with phenolphthalein growth rarely takes place. If growth does occur it is meagre, and there is no liquefaction. In the sugar media neutral to phenolphthalein no growth takes place. However, if nutrient gelatine is rendered neutral to phenol red, i. e., a hydrogen ion concentration of about 7.0, moderate growth usually takes place without liquefaction of the medium. In sugar media neutral to phenol red good growth is obtained with much gassing, but it is not until an abundance of growth has occurred and the solid media, such as glucose or lactose nutrient gelatine, has been broken up, due to the excessive gas evolution and has become acid, that the media become fluid in character. When transferring from a maize culture into gelatine media with the inoculating needle, the fluid portion of the maize culture should serve as the source of inoculent, i. e., the method of inoculation must be such that there will be no noticeable adulteration of the standard gelatine media.

A proceeding for the production of an active fermentation and the recovery of the neutral products is as follows: A small quantity, say, a platinum loopful to 1 c. c. of a pure culture of these bacteria in the resting condition, and containing spores, is transferred to about 10 c. c. of hot, freshly sterilized potato media (say 20%) or rice or maize media (say 4%). The culture is incubated at about 35–38° C. for about twenty-four hours, or until active growth and gassing is evident. These cultures may be used to inoculate flasks of media (say 500–1000 c. c.) or sub-cultures are made into tubes similar to the first containing about 10 c. c. of cooled media, which, after about fifteen to twenty-four hours, may be used to inoculate large quantities of media in flasks. The cultures are incubated for about fifteen to twenty-four hours, when they may be used as inoculant for larger quantities of media, thus ultimately arriving at a fermentation on a large scale. Each transfer from a fifteen to twenty-four hour old culture to fresh sterile cooled media results in another fermentation similar to the preceding one. It is not claimed, however, that this may be carried on indefinitely, even for a period of one year, without impairing the efficiency of the process, but a sufficient number of transfers may be made to assure the fermentation of large quantities of fermentable carbohydrate-containing mash. In the fermentation of large quantities of mash the fermentation may be started by adding the inoculant to the vessel already containing a suitably prepared mash, or the inoculant may be introduced into the vessel and a small fermentation started therein with the subsequent addition of suitably prepared mash. The fermentation process is an anaerobic process. Freshly sterilized and rapidly cooled amylaceous mashes provide a sufficient degree of anaerobiosis to maintain satisfactory conditions. The rapid evolution of gas from an active culture also serves to maintain anaerobic conditions within the fermenting mash or wort. The mash or wort may be made from grains such as corn, barley, wheat, rice, etc. or substances containing fermentable carbohydrate, such as potatoes, either with or without the admixture of other carbohydrates or carbon compounds readily transformed into neutral products such as acetone and butyl alcohol.

At the completion of the fermentation the neutral products are recovered by the usual methods of distillation. Some distillates may separate into two layers, the upper consisting mainly of neutral products and the aqueous portion underneath. These may be separated by known mechanical means with or without the aid of salt. Further purification or recovery from the aqueous layer is effected by distillation, etc.

In a fermentation of a mash of, say, potato or maize not treated in any way, the proportion of butyl alcohol to acetone is about 2 : 1. Although these are the main neutral products produced, small quantities of other neutral products may possibly be formed. The yield of neutral products obtained from, say, maize, is about 33–35% of the weight of the carbohydrate (glucose value).

Having thus described my invention, what I claim as new and desire to secure by Letters Patent is:

1. A process for producing acetone and butyl alcohol, characterized by fermenting carbohydrate material by means of bacteria which may be widely distributed in nature, are anaerobic bacilli with rounded ends, which form large resistant spores and which do not liquefy nutrient gelatine.

2. A process for producing neutral products like acetone and butyl alcohol, characterized by isolating bacteria which are anaerobic bacilli with rounded ends, which form large resistant spores and which do not liquefy nutrient gelatine, and using the same to ferment carbon compounds readily transformed into neutral products.

3. A process for producing acetone, butyl alcohol and other neutral products, characterized by subjecting a substance such as grain, soil or natural waters to such treatment as to obtain anaerobes with rounded ends, capable of forming large resistant spores and incapable of liquefying nutrient gelatine, and then using said anaerobes to ferment carbohydrate material.

4. A process for producing acetone, butyl alcohol and other neutral products, characterized by subjecting a substance such as grain, soil or natural waters to such treatment as to obtain anaerobes capable of forming large resistant spores and incapable of liquefying nutrient gelatine, transferring a culture of said bacteria to sterilized media, incubating said culture until active growth and gassing is evident, and using the resulting cultures to inoculate large quantities of media.

5. A process for producing acetone, butyl alcohol and other neutral products, characterized by subjecting a substance with which bacteria may be associated to such action as to destroy non-spore forming organisms, vegetative cells and spore forming organisms which are only slightly resistant, transferring to solid media, isolating anaerobic bacteria which have rounded ends which form large resistant spores and which do not liquefy nutrient gelatine, and adding a culture of these anaerobes to fermentable media.

6. A process for producing acetone, butyl alcohol and other neutral products, characterized by adding a substance with which bacteria may be associated to sterile water or a sterile solution and subjecting the same to heat so as to obtain spore-forming organisms, isolating therefrom anaerobes with rounded ends which form large resistant spores and which are incapable of liquefying nutrient gelatine, using the same to inoculate media containing fermentable carbohydrate or carbon compounds, and thereafter repeating the inoculating operation with other batches of media of gradually increasing quantities.

7. A process for producing acetone, butyl alcohol and other neutral products, which consists in securing in the resting stage bacteria which are anaerobes, which form large resistant spores and which do not liquefy nutrient gelatine, said bacteria being derived from substances such as grain, soil or natural waters, transferring a small quantity of a pure culture of said bacteria to freshly sterilized media, subjecting said inoculant to heat to kill vegetative cells and promote active growth of the spores, using the resulting cultures to inoculate batches of other media, and repeating the inoculating operation until fermentation on a large scale is arrived at.

8. A process for producing acetone, butyl alcohol and other neutral products, characterized by subjecting a substance such as grain, soil or natural waters to such treatment as to obtain anaerobes with rounded ends, forming large resistant spores and not liquefying nutrient gelatine, and then using said anaerobes to ferment carbon compounds readily transformed into neutral products.

9. A process for producing acetone, butyl alcohol and other neutral compounds, characterized by adding the culture "*Bacillus butylaceticum*" to a suitably prepared mash of fermentable carbohydrate material.

10. A process for producing neutral products like acetone and butyl alcohol, characterized by fermenting a suitably prepared mash of carbon compounds with the culture "*Bacillus butylaceticum*."

GEORGE W. FREIBERG.